T. B. ATTERBURY.
Machine for Shaping and Finishing Glassware.

No. 214,273. Patented April 15, 1879.

Witnesses
C. L. Parker
R. H. Whittlesey

Inventor Thomas B. Atterbury,
By Attorney George H. Christy

UNITED STATES PATENT OFFICE.

THOMAS B. ATTERBURY, OF PITTSBURG, PENNSYLVANIA.

IMPROVEMENT IN MACHINES FOR SHAPING AND FINISHING GLASSWARE.

Specification forming part of Letters Patent No. 214,273, dated April 15, 1879; application filed March 26, 1879.

*To all whom it may concern:*

Be it known that I, THOMAS B. ATTERBURY, of Pittsburg, county of Allegheny, State of Pennsylvania, have invented or discovered a new and useful Improvement in Machines for Shaping and Finishing Glassware; and I do hereby declare the following to be a full, clear, concise, and exact description thereof, reference being had to the accompanying drawings, making a part of this specification, in which—like letters indicating like parts—

Figure 1:
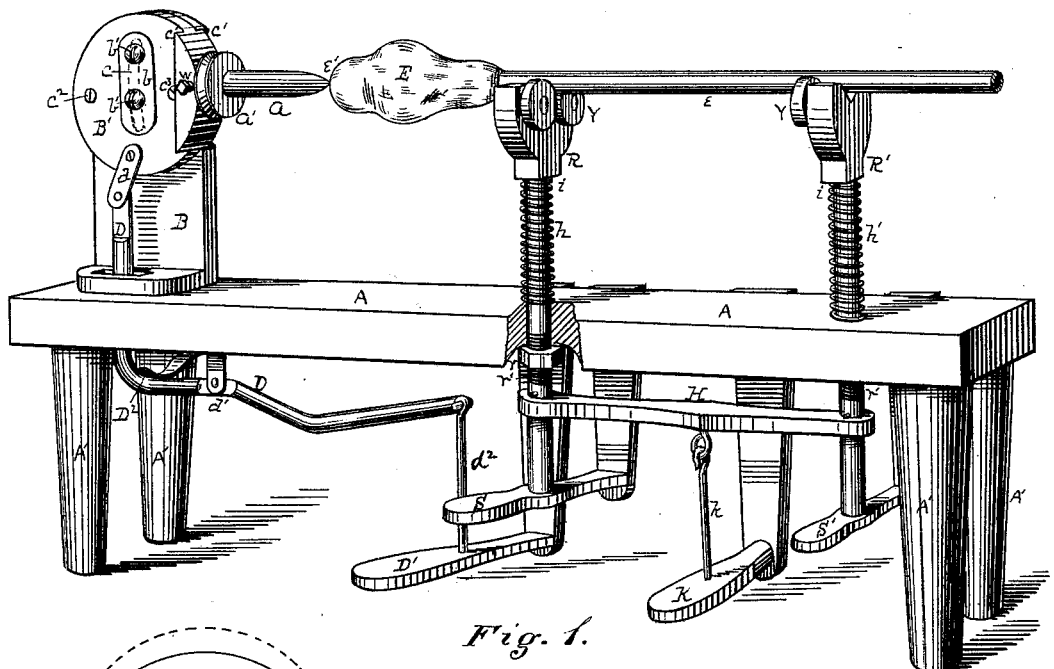

Figure 1 is a perspective view of my improved machine for shaping and finishing glassware; and Figs. 2, 3, 4, and 5 are detached outline views, to an enlarged scale, of a part of the machine, illustrative of varying adjustments and modifications in the machine, whereby it is adapted to different kinds of work.

My invention relates to mechanism for opening out, shaping, and finishing hollow open-ended, tubular, or footed articles of glassware, such mechanism consisting of a machine in which provision is made for securing a cylindrical, flaring, or choke-mouth finish or shape, by varying, at pleasure, the alignment of the article and the finishing or shaping tool, by varying or adjusting the line of feed of the article or the axial line of the tool, or both, including in the term "alignment" the bringing of the line of feed and of the tool into line with each other, or at any desired angle with each other.

In the drawings, A represents a table or foundation, which may be supported in any convenient way, as by legs A'. From one end of this table is erected a standard, B, to the upper end of which a head-block or disk, B', is pivoted or secured, as presently to be described.

To the periphery of this disk is secured a tool or finger, $a$, extending forward or toward the opposite end of the machine, by preference in the same vertical plane as the disk B', and parallel with the standard B. This tool is journaled in the disk by a round stem entering a corresponding hole made radially into the disk, and held by a pin or screw, $w$, working through the face of the disk, and entering a circumferential groove on the stem or by other suitable joint. The tool is thus free to rotate on its own axis, and such rotary motion may be imparted to it through band-wheel $a'$, or in any other desired way. This band-wheel or an equivalent collar may also serve an additional purpose, as hereinafter described.

When, for any reason, it is preferred to hold the tool $a$ stationary or non-rotary, it may be done by tightening the screw $w$, so as to bind the tool in its bearing. If the block or disk B' were fastened rigidly to the standard B, the tool $a$ would have but one position with relation to other fixed parts of the machine. If this position were in the main line of length of the machine, as shown in Fig. 1, it would, for many purposes, be sufficient, as hereinafter described, and such fixed connection may be made by bolts passing through disk and standard, or in other convenient way. I prefer, however, to make a connection between these parts, such that the position of the tool may be shifted either progressively during its operation on the article or before such operation begins.

Various means may be resorted to to effect the desired changes in position, and I have shown one way in which they can be made, as follows: A slot, $c$, (shown by dotted lines in Fig. 1,) is cut through the disk, and screws or bolts $b'$, passing through an overlapping plate, $b$, and through such slots into the adjacent standard, clamp the disk and standard together more or less tightly, as desired.

If the tool $a$ is to retain the same position throughout its operation on the article, these parts may be clamped tightly by tightening the screws; but if a progressive change of position is desired, the disk is left free to be moved between plate $b$ and standard B, and a link-connection, $d$, is made from the rim of the disk to an upwardly-extending arm of a bent lever, D, which is fulcrumed to the under side of the table, as at $d^1$. A treadle, D', connected to the front end of lever D by rod $d^2$, so as to be within reach of the operator, gives the lever motion in one direction, and any suitable spring, D², may give it motion in the opposite direction.

Figure 2:
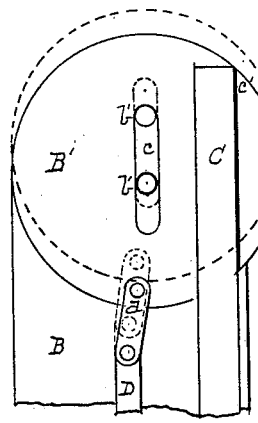

The movement imparted to the disk B' by this lever will depend upon the form of the slot $c$, or of equivalent guides $c^1$, which consist of shoulders on the disk, by preference adjacent to the tool $a$, so as to increase the strength at that point, and the edge of such shoulder or shoulders moves along the edge of the standard B, as in Fig. 1, or along the edge of a guide-bar, C, erected from the table, as in Fig. 2.

Figure 3:
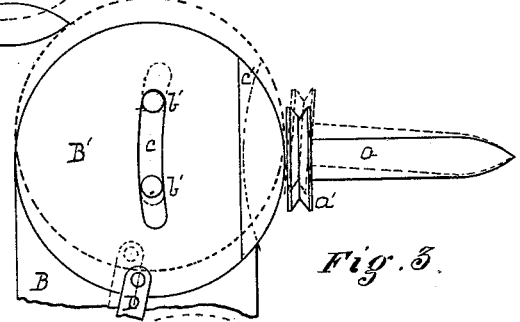

If it is desired to move the tool $a$ in radial lines having common centers at the point of the tool, as illustrated by dotted lines, Fig. 3, the slot $c$ is made in the arc of a circle having the same center; or the guiding-edges of shoulder $c^1$ and standard B are curved in the same manner, as shown by dotted lines, Fig. 3, one or both, whereby the motion given by the lever will be converted into the desired radial motion in the tool.

If it is desired to shift or move the tool in parallel lines toward or from the main axis of the machine, as illustrated in Fig. 2, it may be done by making the slot $c$ or guides C $c^1$, one or both, straight.

Figure 4:
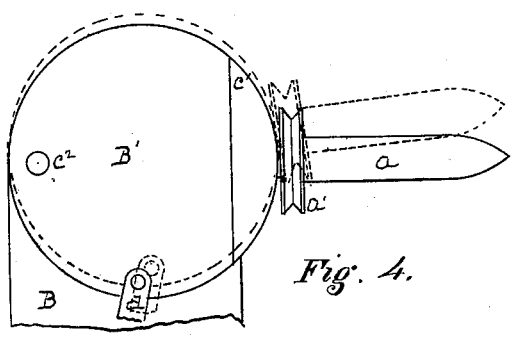
Figure 5:
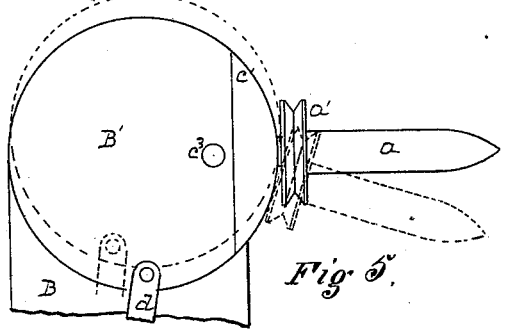

If, again, it is desired to shift the tool on a center in rear of the base of the tool, as illustrated in Figs. 4 and 5, it may be done by passing a bolt, $c^2$, Figs. 1 and 4, through the remote edge of the disk, thus making such bolt the pivotal center of motion of the tool; or the bolt may be passed through the disk on the side adjacent to the tool, as at $c^3$, Figs. 1 and 5. In this latter case the tool is moved downward by depressing the lever instead of upward, as in the other cases mentioned, and also more movement is given to the tool for a given movement of the lever than when arranged as in Fig. 4.

In all these modifications mentioned the slot $c$ may be made of sufficient width to allow of these various movements; but in such case it will not perform the function of a guide, which is not material, provided the equivalent guides $c^1$ or pivots $c^2$ or $c^3$ are used.

The snap or blow-rod $e$, to which the glass article E to be operated on is attached, is laid in adjustable and movable rests R R'. Anti-friction wheels or bearings Y may be arranged on either side of the line of the pipe $e$, upon which it rests and rotates, rotary motion being given to it by a suitable belt or in other convenient way. These rests R and R' are carried down through the table, which serves as a guide for their vertical motion. This vertical motion may be given to either rest separately by means of their respective treadles S S', pivoted to the lower ends of their stems, which draw the rests downward as the treadles are depressed, while springs $h$ $h'$, arranged on the respective rests between the table A and shoulders $i$, will carry each rest upward as its treadle is released. On the other hand, by connecting both rests by a cross-bar, H, and connecting a treadle, K, by rod $k$ to the center of this bar, both rests may be depressed equally and together by depressing treadle K, and upon releasing this treadle the springs will carry the rests upward, as before. In this way either or both rests may be operated at pleasure, and by arranging the several treadles within reach of the operator he can manipulate the several devices described, as occasion may require.

I have shown screw-threads $r'$ cut on the stems of the rests R and R', and nuts $r$ working thereon on the under side of the table. By adjusting these nuts upward the movement of each of the rests can be regulated at pleasure, and the line or direction of the blow-pipe $e$, when the rests are in their normal position, may thus be changed from the horizontal position shown to one more or less inclined to a given position of the tool $a$; also, by arranging similar or any suitable stops on the rests above the table, motion given to them by the treadles below may be regulated, as desired.

My improved machine is adapted for use in shaping and finishing a wide range or variety of articles of glassware. I will describe its operation as employed in opening out, shaping, and finishing the base end of an ordinary slip lamp-chimney, with such reference to its use with various other articles of glassware as will enable the skilled mechanic to use the machine as required.

The desired form of the body E of such chimney is usually secured by the process of blowing in a mold, and in so doing the base end $e'$ is given a semi-globular form, which is to be subsequently opened out into a cylindrical base. In performing this last operation with my machine, the blown chimney-blank, being properly heated, and while still attached to the blow-pipe or secured in a suitable snap, is laid in the rests R R', they being adjusted, as shown in Fig. 1, so as to present the center of the base of the chimney to the point of the tool. By confining the air within the article, and then pressing it against the sharp point of $a$, a perforation will be made, and the end of the article may be passed onto the body of the tool the desired distance. Then, the article being rotated rapidly on its own axis, and, if preferred, the tool $a$ being also rotated on its axis in either direction, the workman places his foot on treadle D', and the disk B', being arranged as in Fig. 2, raises the tool bodily upward or away from the rotary axis of the article, but maintaining a parallel relation between the two; or, as an equivalent, the workman may depress the treadle K, thus moving or depressing the article out of the line of the tool, but preserving a parallel relation, as before, between the rotary axis of the article and the axis of the tool. As this is done the perforated end of the article is opened out and given the desired cylindrical form and finish, and by passing the article far enough onto the tool $a$ so that as the base is opened out its edge will bear against the collar or wheel $a'$, such edge will also be finished and made true and smooth.

In finishing the top end of the chimney, a flaring or bell mouth is usually given to it. This may be done on my machine by breaking or severing the chimney from the blow-pipe, securing it in a suitable snap, and passing the open forward end of the chimney onto the tool. Then, by depressing the treadle D', the disk-connection being arranged as in Fig. 3, the base end of the tool will be carried out of the axial line of rotation of the article to a greater or less degree, as desired, and a corresponding flare given to the end of the article; or, as an equivalent of such operation or co-operative therewith, either the inner or outer rest may be depressed, either alone or one more than the other, and the same or a similar flaring effect be secured, the tool remaining horizontal or being tilted in the same direction as the article—that is to say, the forward or engaging ends of tool and article both going up or down, or in such manner that the base of the tool, or some point near the base, shall, in doing such shaping work, first engage the extremity of the glass article or engage it with the heavier pressure, and in continuing the same give the flare shape desired.

In opening out and shaping the feet of lamps, goblets, and footed table-ware of various kinds, whether blown or pressed, the workman may make use of both of the methods last mentioned for changing the relation of tool and rotary axis of the article. Nearly or quite double the relative change between tool and article may thus be obtained, which will be amply sufficient for opening out most forms of table-ware feet or lamp-feet.

If, in finishing the mouths of bottles, jars, or similar articles, a choke or contracted mouth is desired, it may be secured by arranging the disk as in either Fig. 4 or Fig. 5, and then shifting the tool as illustrated in those figures by depressing treadle D'; and the rests R R' may be used as a co-operative or independent means of securing the same operation by depressing one or both such rests, (one more than the other,) but in such manner that the point of the tool shall, in doing such shaping work, first engage the glass or engage it with the heavier pressure, and, in continuing the same, give the choke shape desired.

If the mouth or end of the article to be shaped and finished has, before being placed on the tool, an opening of some considerable size, the rests R R' may be adjusted by means of the nuts $r$ so as to bring the rim of the article near to or against the working-face of the tool as the article is fed forward to it. Needless movement of the tool or article, or of both, during the shaping and finishing operation will thus be avoided; or, by properly adjusting the rests, as described, the outer surface of the article may be brought to bear against the working-face of the tool $a$; and by shifting either the tool or the rests, as herein described, progressively as the article is rotated, the desired shape and finish may be given to the exterior of many articles.

I have shown and described a simple parallel-sided tool or finger, $a$, by means of which the various operations mentioned may be performed. I do not limit my invention, however, to this or any particular form of tool, as such form may be varied at pleasure, adapting it to the work to be done—as, for example, the tool may be curved or arched in the direction of its length, and adapted to give a longitudinal bulge or swell to the article, as is common in globes, hotel-goblets, beer-mugs, and other like articles.

The band-wheel $a'$ may be omitted, if so preferred, and the tool $a$ be left free to rotate by frictional contact with the glass articles. The glass article may also be perforated before being presented to the tool $a$, if so preferred; or the lower end may be made open in the operation of blowing, or by removing a blow-over, in the manner well known in the art.

It will also be practicable to flare on the same machine by first opening the mouth of the article to a cylindrical form on the tool $a$, of a diameter equal to that of the base of the flare, and then withdraw the article slowly, depressing the rests or raising the tool progressively, so as to cause the taper or rounded end of the tool to traverse the part to be flared from base to mouth, gradually enlarging the same by an operation akin to that of spinning. In this operation the axial lines of the tool and article must, during the spinning operation, gradually and progressively depart or vary each from the other, and for this sufficient provision is made in the machine described. Preferably the tool should have a well-rounded end or spinning-face; but in this respect I do not limit myself, as the shape or form of the tool may be varied at pleasure with reference to the work to be done.

Any suitable crimping device may be arranged at or on the base of the tool $a$, and used, when desired, to crimp the flared article, in the usual way.

I claim herein as my invention—

1. In the operation of shaping tubular open-ended glassware, the method of spinning a flare by causing the taper or rounded end of a tool to traverse the part to be flared progressively from base to mouth, while the axial lines of the article and tool gradually and progressively depart or vary each from the other, substantially as set forth.

2. The method of mechanically shaping or finishing articles of glassware, by rotating the heated article on its own axis and over or against a finishing-tool, and simultaneously with such rotation progressively moving the axial line of rotation, substantially as set forth.

3. The method of mechanically shaping or finishing articles of glassware, by rotating the heated article on its own axis on or against a single shaping and finishing tool, and progressively during such rotation increasing or diminishing the angle of inclination between the axial line of such rotation and the line or face of the tool, substantially as set forth.

4. In a glass shaping and finishing machine, the combination of a tool, $a$, rotary or non-rotary upon its own axis, and rests R R', adapted to move either separately or in unison toward or from the axial line of the tool, at the will of the operator, substantially as set forth.

5. In a machine for shaping and finishing glassware, in which the article to be operated on is rotated on its own axis, a single shaping and finishing tool, $a$, rotary or non-rotary upon its own axis, and pivoted or adjustably secured to its support, in combination with mechanism for progressively shifting the position of the tool, and thereby increasing or decreasing its inclination to the axis of rotation of the article, substantially as set forth.

6. In a machine for shaping and finishing glassware, the combination of a shaping and finishing tool, $a$, rests R R', one or both movable toward or from the line of the tool, and mechanism for progressively operating such rests, either separately or in unison, substantially as set forth.

7. In a machine for shaping and finishing glassware, the combination of rests R R', movable either separately or in unison, mechanism for progressively operating the rests, and adjustable stops for limiting the movement of the rests, substantially as set forth, whereby the position or direction of the snap or rod carried by the rests may be varied at the will of the operator.

8. In a machine for shaping and finishing glassware, the combination of pivoted or adjustable shaping and finishing tool $a$, rests R R', for supporting the article, one or both of which are movable, and mechanism for progressively operating both the tool and one or both the rests, either simultaneously or in succession, substantially as set forth.

9. The combination of tool $a$, disk B', standard B, and mechanism for securing disk to standard, substantially as described, whereby the disk is movable or adjustable on the standard.

10. The combination of standard B, disk B', pivoted to the standard, and having guiding-slot $c$, or equivalent shoulder $c^1$, tool $a$, secured to the disk, link $d$, lever D, treadle $D^1$, connected to the lever, and spring $D^2$, substantially as set forth.

In testimony whereof I have hereunto set my hand.

THOS. B. ATTERBURY.

Witnesses:
R. H. WHITTLESEY,
C. L. PARKER.